(12) United States Patent
Lai et al.

(10) Patent No.: US 6,396,521 B1
(45) Date of Patent: May 28, 2002

(54) METHOD FOR AUTOMATICALLY SWITCHING WINDOWS OF DIFFERENT SIZES

(75) Inventors: Cheng-Shing Lai, Taipei (TW); Rong-Hu Zhu; Yong Pan, both of Nanjing (CN)

(73) Assignee: Inventec Electronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 09/393,299

(22) Filed: Sep. 10, 1999

(51) Int. Cl.[7] .............................. G06F 3/14; G06F 3/02; G09G 5/34
(52) U.S. Cl. ...................... 345/800; 345/784; 345/160; 345/864
(58) Field of Search .................................. 345/800, 798, 345/784, 785, 856, 788, 802, 803, 789, 777, 781, 864, 157, 160, 162, 168

(56) References Cited

U.S. PATENT DOCUMENTS

| | | | | |
|---|---|---|---|---|
| 4,714,918 A | * | 12/1987 | Barker et al. ........... | 345/798 X |
| 5,237,312 A | * | 8/1993 | Akiyama et al. ........ | 345/784 X |
| 5,568,603 A | * | 10/1996 | Chen et al. .................. | 345/784 |
| 5,689,284 A | * | 11/1997 | Herget ..................... | 345/856 X |
| 5,867,158 A | * | 2/1999 | Murasaki et al. ........... | 345/785 |
| 6,011,550 A | * | 1/2000 | Capps et al. ................ | 345/788 |
| 6,154,194 A | * | 11/2000 | Singh ..................... | 345/788 X |

* cited by examiner

*Primary Examiner*—Raymond J. Bayerl
(74) *Attorney, Agent, or Firm*—Birch, Stewart, Kolasch & Birch, LLP

(57) ABSTRACT

A method for automatically switching windows of different sizes particularly shown in a small display screen of a compact portable personal computer by means of determining a current position of a cursor and a key typed by a user is disclosed. By utilizing this, a larger window switching to a smaller window or vice versa is carried out automatically by the computer, thereby enabling a convenient operation.

11 Claims, 6 Drawing Sheets

| [F1] | : HELP |
| [F5] | : INDEX |
| [^][v] | : SEARCH |

Before the harmonization of the substantive patent law thorughout Europe,the respective nactional laws and jurisdictions with regard to the scope(extent) of patents were quite different.

In Germany, a harmonized patent law came

FIG. 4

Before the harmonization of the substantive patent law thorughout Europe,the respective nactional laws and jurisdictions with regard to the scope(extent) of patents were quite different.

In Germany, a harmonized patent law came into effect on January 1,1978 (PatG 1978,now PatG1981),the major substantive regulations of which are applicable to all German patent

FIG. 5

METHOD FOR AUTOMATICALLY SWITCHING WINDOWS OF DIFFERENT SIZES

BACKGROUND OF THE INVENTION

1. Field of Invention

The present invention relates to a method for switching windows in computer based system, and more particularly to a method for automatically switching windows of different sizes by means of determining a current position of a cursor and a key typed by a user when implementing a computer program.

2. Related Art

Personal digital assistants (PDAs) have been widely used in recent years. It is featured by its portability and compactness. As a result, display (e.g., LCD) is made small. It is also known there are other messages in addition to text edited by user shown on the display screen. For example, content of e-mail, recipient, title, etc., are shown on screen when editing or reading an e-mail in the PDA. As such, only a limited space is left for showing content. Consequently, user has to scroll several times to view the whole text. It is indeed not convenient.

A technique for manually switching windows of different sizes has been proposed in operating PDA by means of pressing a number of predetermined function keys or hot keys for switching between a half-screen window and a full-screen window. But this is unsatisfactory because a skilled window switching operation is made possible only when a user thoroughly reads the operating manual and practices accordingly. It is quite inconvenient.

SUMMARY OF THE INVENTION

It is thus an object of the present invention to provide a method for automatically switching windows of different sizes particularly shown in a small display screen of a compact personal computer by means of determining a current position of a cursor and a key other than a predetermined function key and a hot key typed by a user. By utilizing this, a larger window switching to a smaller window or vice versa is carried out automatically by the computer, thereby enabling a convenient operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 4 illustrates a text shown in a half-screen window; and

FIG. 5 illustrates a text shown in a full-screen window.

DETAILED DESCRIPTION OF THE INVENTION

First Embodiment

The features of the embodiment are realized by 1) designing two different windows of different sizes as well as other associated parameters, such as the initial position and height of each window; and 2) switching between the two different windows.

In operation, a message event driven based system automatically switches the different sized windows, i.e., a flowchart is implemented based on the instruction contained in the message. Each application procedure is required to create a number of windows. Each event is converted into a message by the system. The message is then assigned to a message queue to wait processing. The message queue forms a message loop that sequentially sends messages to window functions for execution.

A main window and a number of sub windows (e.g., a window for editing and a window for listing available options) are created during the application procedure. Take the edition window as an example, the application procedure creates a half-screen window for editing each window. The system sends a message to window functions for processing execution when a text is typed into a sub window. A FALSE result is created and sent back by the sub window when no processing has been done, after which, the main window function processes it However, the message is processed by a sub window when the first sub window produces and returns a TRUE result.

Two call back functions, i.e., the main window and sub window functions, are employed by this invention. A sub procedure informs the system of the current position of a cursor so it can carry out the window switching. A detailed description of the automatically windows switching method follows.

Figure 1A:
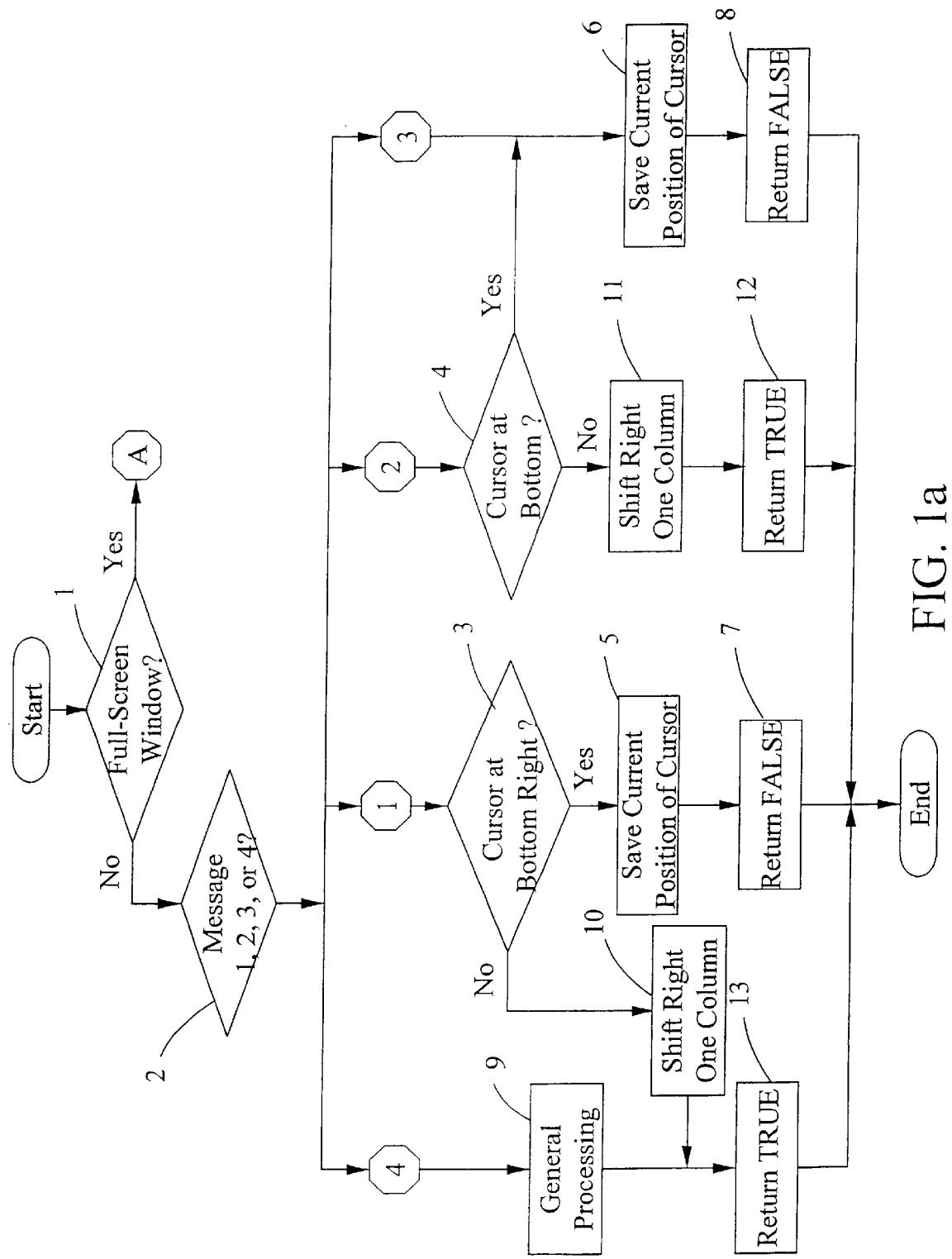
FIG. 1a is a flowchart illustrating how a sub window function is performed in a half-screen window environment according to a first embodiment of the present invention.
Figure 1B:
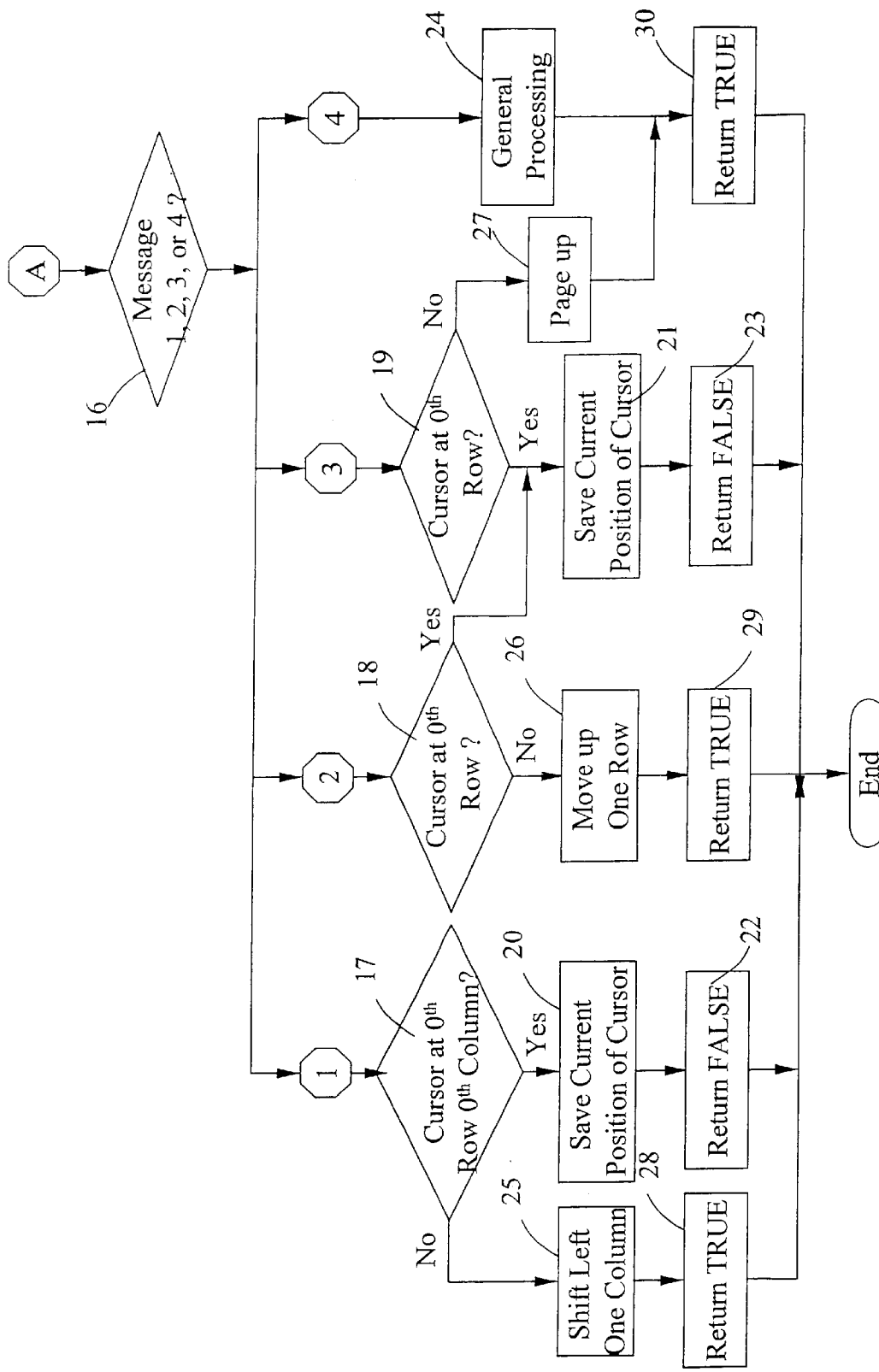
FIG. 1b is a flowchart illustrating how a sub window function is performed in a full-screen window environment according to a first embodiment of the present invention.

(a) Sub window function processing:

FIGS. 1a–1b present a sub window flowchart.

In step 1, it is to determine whether the current sub window is a half-screen window as shown in FIG. 1a. If it is not, the flowchart transfers to FIG. 1b, whereas the message is categorized as message 1, message 2, message 3, or message 4 in step 2 if it is a half-screen window. In other words, it is determined whether a window scrolling occurs when a right key (message 1), a down key (message 2), a page down key (message 3), or other key (message 4) is pressed. Go to step 3, if right key is pressed, step 4 for a down key, and step 6 for a page down key. God to step 9 to process in a general manner, if any other key is pressed, and then the procedure goes to step 13.

In step 3, it is to determine whether the cursor is at the bottom right position of sub window. If it is, go to step 5 or go to step 10 to shift the cursor one column to the right. The procedure then goes to step 13.

In step 4, it is to determine whether the cursor is at the bottom position of sub window. If it is, go to step 6 or go to step 11 to shift cursor one column to the right. The procedure then goes to step 12.

In. step 5, the current position of the cursor is saved prior to scrolling the window. The procedure ends at step 7 after returning a FALSE result.

In step 6. the current position of the cursor is saved prior to scrolling the window. The procedure ends at step 8 after returning a FALSE result. In step 12 or 13, a TRUE result is produced and the procedure ends.

In FIG. 1*b* illustrates the flowchart when the current sub window is determined as a full-screen window in step 1.

Similarly, a message is categorized into message 1, message 2, message 3, or message 4 as in step 16. Step 17 for a left key (message 1), step 18 for an up key (message 2), and step 19 for a page up key (message 3) is pressed. Go to step 24 for any other key (message 4) is pressed to process in a general manner and the procedure then goes to step 30 to return a TRUE result before the procedure ends.

In step 17, it is to determine whether the cursor is on the top left position of the logic column (i.e., an index of text), that is, the zeroth column the zeroth row. If it is, save the current position of the cursor (step 20) prior to scroll the window and then return a FALSE result (step 22) before end the procedure. If it is not, shift the cursor one column to the left (step 25) and return a TRUE result (step 28) before end the procedure.

In step 18 or 19, it is to determine whether the cursor is on the first row (i.e., the zeroth row) of logic row. If it is, save the current position of the cursor (step 21) prior to scroll the window and then return a FALSE result (step 23) before end the procedure. If it is not, process in a general manner, i.e., move the cursor up one row (step 26) or page up (step 27) and then a TRUE result is returned (step 29 or 30) respectively before the procedure ends.

Figure 2:
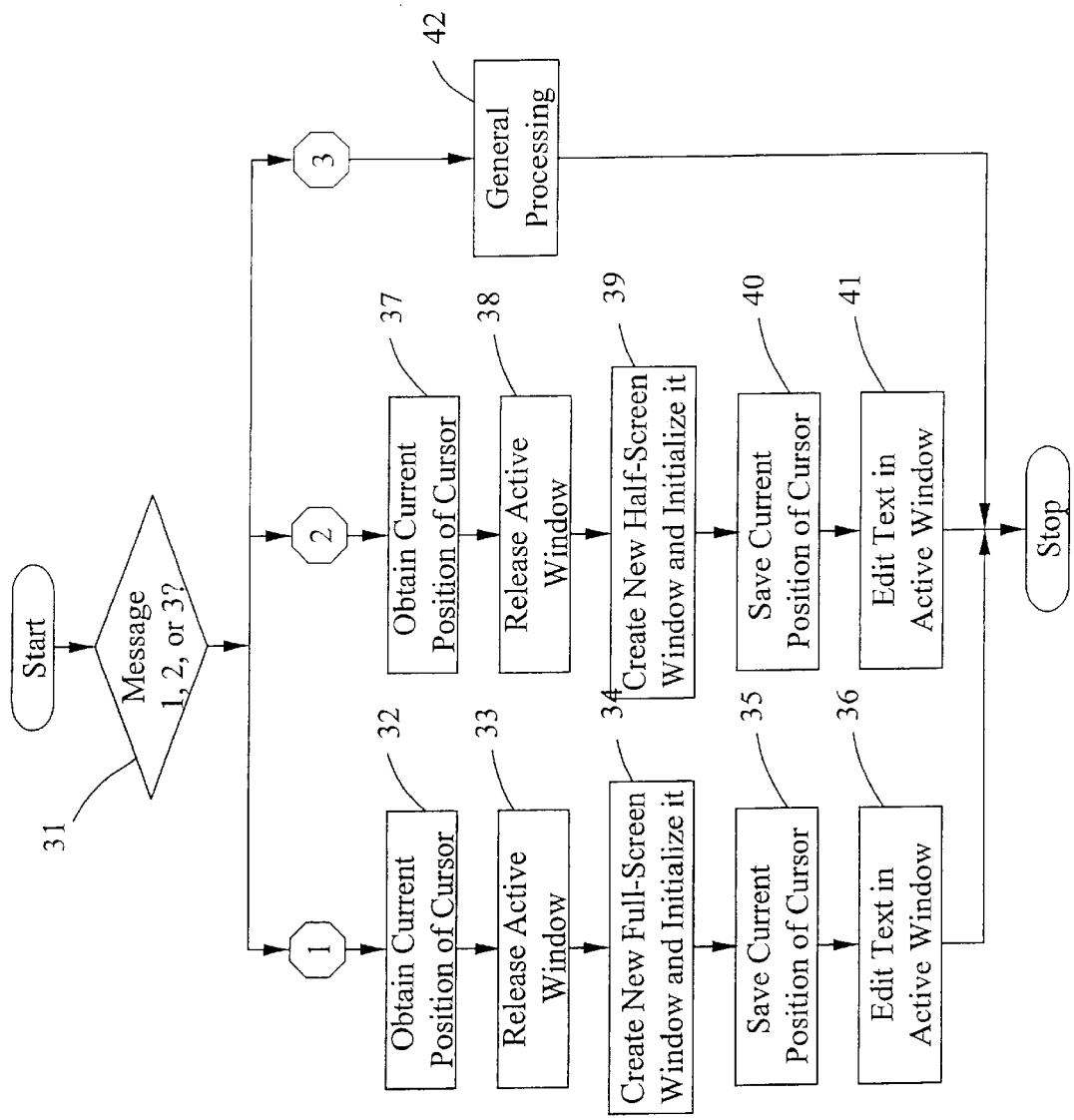
FIG. 2 is a flowchart illustrating how a main window function is performed according to a first embodiment of the present invention.

(b) Main window function processing:

FIG. 2 reveals a main window flowchart.

In step 31, if the message is performed by a sub window (i.e., a FALSE result returned by current position), it is arranged into message 1 (i.e., down, right, or page down message) to switch from half-screen window to full-screen window and advance to step 32, and message 2 (i.e., up, left, or page up message) to switch from full-screen window to half-screen window and continue to step 37; whereas it is message 3 to go to step 42 to process in a general manner and then the procedure terminates.

In step 32, obtain the current position of the cursor then, and then release active window (step 33). Create a hew window, switch to a full-screen window, and initialize that window (step 34). Locate the cursor on the window (step 35). Edit text in the current window (step 36), and end the procedure.

In step 37, obtain the current position of the cursor, and then release the active window (step 38). Create a new window. switch to a half-screen window, and initialize that window (step 39). Locate the cursor on the window (step 40). Edit text in the current window (step 41), and end the procedure.

In summary, a half-screen window or full-screen window is created by the application procedure by means of determining the current position of the cursor and a key typed by user.

Second Embodiment

Figure 3A:
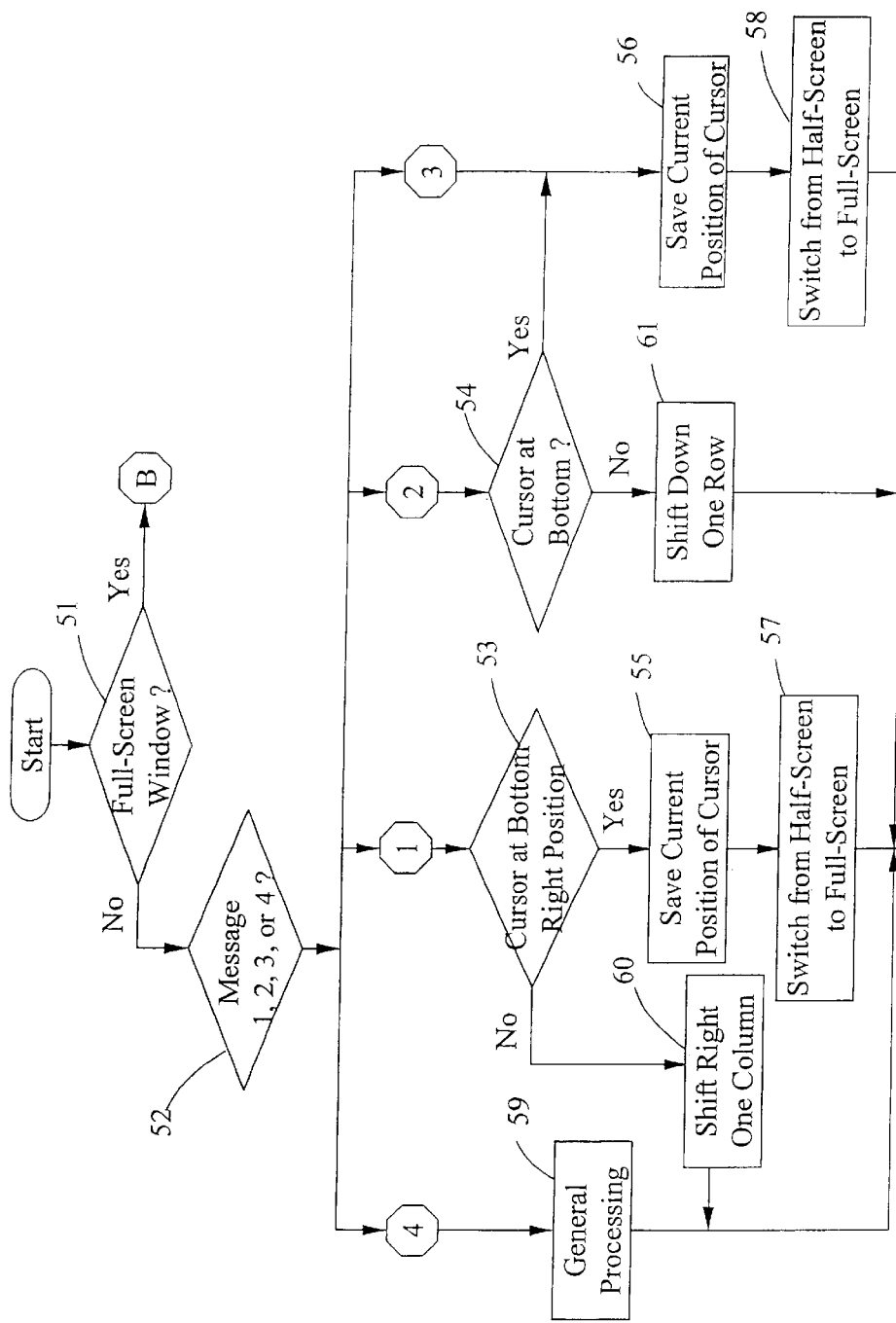
FIGS. 3a–3b are flowchart illustrating a second embodiment of the present invention respectively.
Figure 3B:
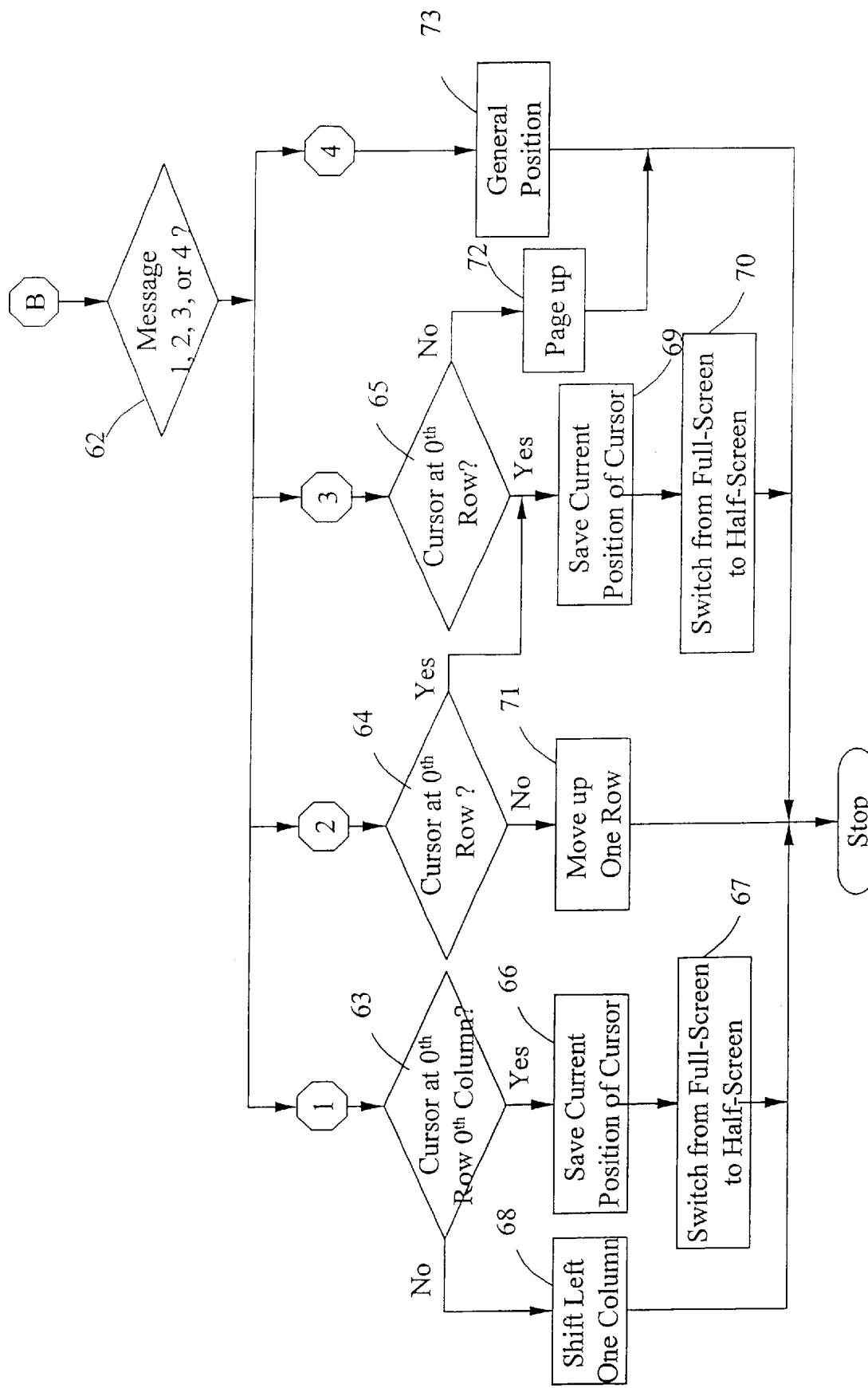

A-process of switching half-screen window to full-screen window or vice versa. illustrated in FIGS. 3*a*–3*b* is carried out by determining the current position of the cursor and the key typed by user.

It is to provide two functions, i.e., Half_To_Full( ) for switching from half-screen window to full-screen window and Full_To_Half( ) for switching from full-screen window to half-screen window.

In step 51, it is determined whether the current window is a full-screen window in FIG. 3*a*. If it is, flowchart transfers to FIG. 3*b*, whereas the message is categorized as message 1, message 2, message 3, or message 4 in step 52. In other words, it is determined whether a window scrolling occurs when a right key (message 1), a down key (message 2), a page down key (message 3), or other key (message 4) is pressed. Go to step 55 or 56 to save the current position of the cursor, if page down key is pressed, or right key is pressed and the cursor is at the bottom right position (step 53), or down key is pressed and cursor is at the bottom row (step 54). Then use Half_To_Fullo function to switching from half-screen window to full-screen window (step 57 or 58) and locate the cursorbefore end the procedure. However, a window scrolling does not occurs when right key or down key is pressed while the current position of the cursor is not at the bottom right position or at the bottom row, i.e., simply shift the cursor one column to the right (step 60); or simply move cursor down one row (step 61); then the procedure ends. Go to step 59 to process in a general manner, if any other key is pressed (message 4) and then end the procedure.

In FIG. 3*b* illustrates the flowchart when the current window is determined as a full-screen window in step 51.

Similarly, a message is categorized into message 1, message 2, message 3, or message 4 as in step 62. If left key (message 1) is pressed, it is determined whether the cursor is on the top left position of the logic column (i.e., the zeroth column the zeroth row) (step 63). If it is, save the current position of the cursor (step 66) and use Full_To_Half( ) function to switching from full-screen window to half-screen window (step 67), whereas process in a general manner, i.e., shift the cursor one column to the left (step 68); and then end the procedure. If up key (message 2) or page up key (message 3) is pressed, it is determined whether the cursor is on the first column (i.e., the zeroth column) of logic column (step 64 or 65). If it is, save the current position of the cursor (step 69) and use Full_To_Half( ) function to switching from full-screen window to half-screen window (step 70), whereas process in a general manner, i.e., move the cursor up one row (step 71) or move the cursor page up (step 72); and then end the procedure. Go to step 73 to process in a general manner if any other key (message 4) is pressed and then end the procedure.

An exemplary example is illustrated in FIGS. 4 and 5 wherein a seven-row window in association with a list of available options and a ten-row window are shown respectively. Both windows have the same width as the display screen of PDA.

In FIG. 4. a user edits in a seven-row window. Simultaneously, system sends a current editing condition (i.e., message) to a sub window and a main window functions respectively. The system will response if a down key is pressed and cursor is at the bottom row of window, i.e., a current position of cursor is saved and a FALSE result (i.e., message) is sent back. The message will be processed by main window function when it is received in message loop. When the message is received by main window function, a number of actions will be sequentially taken by main window function, such as saving a current position of cursor, disabling active window, creating a new window with ten-row, repositioning cursor based on the previously saved position, and returning control to new window for allowing further keying as shown in FIG. 5. This is an implementation of switching from half-screen window to full-screen window.

Likewise, a user edits in a seven-row window. Simultaneously, system sends a current editing condition (i.e., message) to a sub window and a main window functions respectively. The system will response if an up key is pressed and cursor is on the top row of window, i.e., a current position of cursor is saved and a FALSE result (i.e., message) is saved. The message will be processed by main window function when it is received in message loop. When the message is received by main window function, a number of actions will be sequentially taken by main window function, such as saving a current position of cursor, disabling active window, creating a new window with seven-row, repositioning cursor based on the previously saved position, and returning control to new window for allowing further keying as shown in FIG. 4. This is an implementation of switching from full-screen window to half-screen window.

Similarly, a switching will be taken if other keys, as stated above, meant to cause a window switching are press ed in a predetermined condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically switching windows of different sizes by means of determining a current position of a cursor and a key typed by a user, comprising the steps of:

setting an initial window as an active window;

obtaining a message about a movement of the cursor in the active window;

amplifying the active window when the active window is scrolled down;

setting the amplified active window as a new active window; and reducing the active window when the active window is scrolled up.

2. The method of claim 1, wherein the message about the movement of the cursor is created by pressing a predetermined key.

3. The method of claim 2, wherein the pressed predetermined key is a page down key for scrolling down the active window.

4. The method of claim 2, wherein the pressed predetermined key is a down key and the current position of the cursor is at a bottom position of the active window for scrolling down the active window.

5. The method of claim 2, wherein the pressed predetermined key is a right key and the current position of the cursor is at a bottom right position of the active window for scrolling down the active window.

6. The method of claim 2, wherein the pressed predetermined key is a page up key and the current position of the cursor is on a top position of the active window for scrolling up the active window.

7. The method of claim 2, wherein the pressed predetermined key is an up key and the current position of the cursor is on the top position of the active window for scrolling up the active window.

8. The method of claim 2, wherein the pressed predetermined key is a left key and the current position of the cursor is on a top left position of the active window for scrolling up the active window.

9. A method for automatically switching windows of different sizes by means of determining a current position of a cursor and a key typed by a user, comprising the steps of:

creating a first window and a second window smaller than the first window;

setting the second window as an active window;

obtaining a message about a movement of the cursor in the active window;

switching to the first window when the active window is scrolled down;

setting the first window as the active window;

switching to the second window when the active window is scrolled up; and setting the second window as the active window.

10. The method of claim 9, wherein the creation of windows comprises a setting of an initial position and a height thereof.

11. The method of claim 9, further comprising the steps of:

saving the current position of the cursor;

disabling the active window;

switching to the other window;

setting the other window as the active window;

initializing the active window;

repositioning the cursor based on the saved position; and editing the active window.

* * * * *

UNITED STATES PATENT AND TRADEMARK OFFICE
CERTIFICATE OF CORRECTION

| | | |
|---|---|---|
| PATENT NO. | : 6,396,521 B1 | Page 1 of 1 |
| APPLICATION NO. | : 09/393299 | |
| DATED | : May 28, 2002 | |
| INVENTOR(S) | : Cheng-Shing Lai, Rong-Hua Zhu and Yong Pan | |

It is certified that error appears in the above-identified patent and that said Letters Patent is hereby corrected as shown below:

Title Page item (75), second inventor's name should read "RONG-HUA ZHU"

Signed and Sealed this
Tenth Day of November, 2015

Michelle K. Lee
*Director of the United States Patent and Trademark Office*